UNITED STATES PATENT OFFICE.

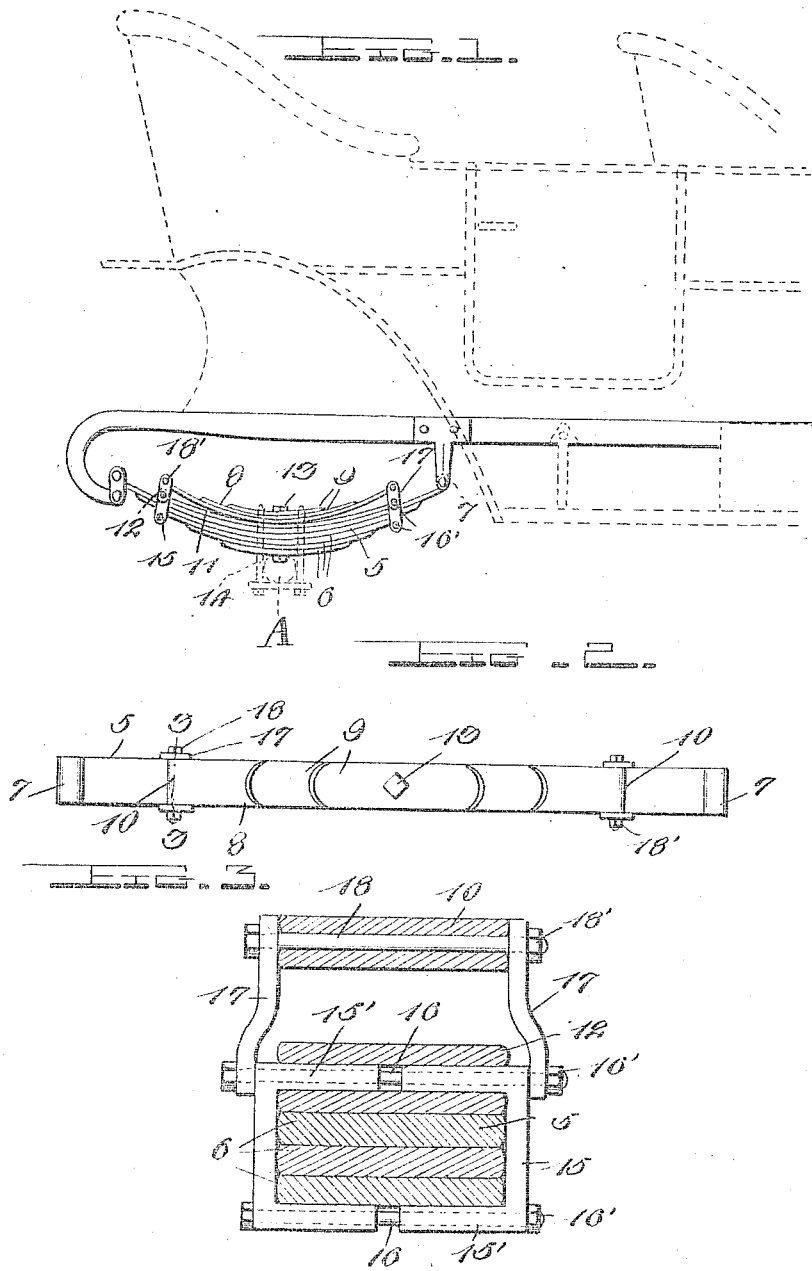

NILS W. KAUNITZ, OF HOQUIAM, WASHINGTON.

SHOCK-ABSORBING SPRING.

1,044,661.   Specification of Letters Patent.   Patented Nov. 19, 1912.

Application filed December 9, 1911. Serial No. 664,851.

*To all whom it may concern:*

Be it known that I, NILS W. KAUNITZ, a subject of the King of Sweden, residing at Hoquiam, in the county of Chehalis and State of Washington, have invented certain new and useful Improvements in Shock-Absorbing Springs, of which the following is a specification, reference being had to the accompanying drawings.

This invention relates to shock absorbing springs for vehicles and has for its primary object to provide means whereby the durability and efficiency of such devices is materially increased, and the rebound of the springs counteracted.

A further and more specific object of the invention is to provide a main vehicle spring of the laminated leaf type, a supplementary spring arranged above the main spring, and means interposed between said main and supplementary springs to assimilate the recoil or rebound of said springs when the load is removed therefrom.

A further object of the invention is to provide main and supplementary spring elements and an interposed spring acting in opposition to said spring elements, and means connecting the several springs at their ends for relative movement.

With the above and other objects in view, the invention consists of the novel features of construction, combination and arrangement of parts hereinafter fully described and claimed, and illustrated in the accompanying drawings, in which—

Figure 1 is a side elevation illustrating my improved spring applied to an automobile body; Fig. 2 is a top plan view of the spring; Fig. 3 is an enlarged section taken on the line 3—3 of Fig. 2.

In the accompanying drawings I have illustrated my invention as embodied in the common semi-elliptic form of vehicle spring but it will be understood that the following description of the construction and arrangement of the elements is also applicable to the three-quarter or full elliptic spring which is commonly used upon heavy vehicles.

Referring specifically to the drawings and more particularly to Figs. 1 to 3 thereof, 5 designates the main spring which is of laminated construction and consists of a plurality of superimposed spring plates 6, said plates successively increasing in length. The ends of the uppermost longest spring plate are bent upon themselves to form sleeves 7 for connection to suitable attaching yokes, which are rigidly secured to the under side of the vehicle body frame.

A supplementary spring 8 is arranged above the main spring 5 in spaced relation thereto. This supplementary spring is also composed of superimposed spring plates 9 which successively increase in length reversely to the spring plates 6 of the main spring so that the longest plate of the supplementary spring 8 is opposed to the uppermost plate of the main spring 5. The longer plate of the supplementary spring is, however, appreciably shorter than the upper plate of the main spring and in its normal condition describes an arc of less radius than said latter spring plate. The extremities thereof are provided with the eyes or sleeves 10 and the end portions of the main and supplementary springs normally exert an upward tension upon the load. Between these main and supplementary spring elements, a counteracting spring plate 11 is interposed, said plate being of substantially the same length as the lowermost spring plate of the supplementary spring 8 and having eyes or sleeves 12 formed upon its ends. A connecting bolt 13 passes centrally through openings provided in the several spring plates 6, 9 and 11 and rigidly connects the same. The usual axle clip 14 also embraces the several spring plates and secures the spring upon the vehicle axle indicated at A in Fig. 1.

The main and supplementary springs 5 and 8 and the counteracting spring plate 11 are connected by means of suitable clips so that the end portions thereof are capable of independent relative movement. These connecting clips are clearly illustrated in Fig. 3 of the drawings and each comprises in its preferred form a pair of U-shaped clip members 15, the arms 15′ of which receive between them the edge portions of the superimposed spring plates 6 of the main spring, the upper arms 15′ being received in the sleeves 12 formed on the ends of the counteracting spring plate 11. These clip members are connected by the bolts 16, the arms 15′ thereof being longitudinally bored to loosely receive said bolts. Upon the ends of the uppermost bolt 16 the lower ends of the connecting arms 17 are arranged. The upper ends of the arms 17 are connected by means of a bolt 18 which is disposed through the sleeve 10 on the end of the lowermost spring plate 9 of the supplementary spring 8. The arms 17 are loosely mounted on the bolt 16 so that they are free to rock thereon in the movement of the several spring elements. Suitable nuts 16' and 18' are of course threaded upon the ends of the bolts 16 and 18 respectively to retain the same in position and maintain the several elements connected thereby in assembled relation.

The operation of the above described construction is as follows. In the passage of the vehicle over an obstruction or an uneven grade surface, the weight of the load upon the main spring 5 places the same under tension, the ends of said spring being forced downwardly. As this main spring is connected to the supplementary spring 8, said latter spring is also placed under tension and assists the main spring in assimilating the pressure of the load. The spring plate 11 normally exerts a downward pressure upon the main spring and when the ends of said main spring are subjected to pressure, the tendency of the spring plate 11 is to straighten out. Upon the rebound or recoil of the main and supplementary springs 5 and 8, the downward pressure of the spring plate 11 counteracts this recoil and prevents the same being transmitted to the vehicle body, said interposed spring plate also relieving the main and supplementary springs of undue strain and eliminating liability of breakage of the plates 6 and 9. Owing to the fact that the clip members 17 are swiveled upon the upper bolts 16, it will be obvious that the connected ends of the main and supplementary springs are independently movable. By means of this construction, it will be seen that a very simple, durable and effective shock absorbing spring for automobiles or other heavy vehicle bodies is produced.

From the foregoing it is believed that the construction and operation of my improved shock absorbing spring will be fully understood. The device may be manufactured at but slightly greater cost than the common form of such springs now in use and provides means whereby the liability of breakage of the springs is reduced to a minimum.

While I have shown and described the preferred form and construction of the various elements, it will be understood that the invention is susceptible of modification in the form and proportion thereof without departing from the essential feature or sacrificing any of the advantages of the invention.

Having thus described the invention what is claimed is:—

1. A vehicle spring comprising main and supplementary spring elements arranged in spaced relation, a counteracting spring element interposed between the main and supplementary springs to resist the recoil thereof upon the release of load pressure, and means connecting said main and supplementary springs and the counteracting spring to permit of their relative movement upon the release of the load pressure.

2. A vehicle spring comprising a main spring, a supplementary spring arranged above and in spaced relation to the main spring, a counteracting spring plate interposed between the main and supplementary springs and extending longitudinally upon the main spring, clips embracing the main spring and pivotally secured to the ends of said interposed spring, and arms pivotally connected to said clips and to the ends of the supplementary spring whereby relative movement of said springs is permitted under the pressure of the load thereon and in the rebound of said main spring.

3. A vehicle spring comprising a semi-elliptical main spring, a semi-elliptical supplemental spring arranged above and in spaced relation to the main spring, a counteracting spring plate interposed between the main and supplemental springs and extending longitudinally upon said main spring throughout its length, sectional clips arranged upon the main spring adjacent its ends, said spring being movable through the clips, bolts connecting the clip sections above and below said main spring, the ends of the counteracting spring plate being loosely connected to the clip sections, arms pivotally connected to the ends of the supplemental spring and to said clips, and means rigidly securing the main and supplemental springs and the counteracting spring plate together at their centers, said counteracting spring plate exerting a downward pressure upon the main spring and acting to resist the recoil of the main and supplemental springs when the load pressure thereon is released.

In testimony whereof I hereunto affix my signature in the presence of two witnesses.

NILS W. KAUNITZ.

Witnesses:
ANGUS M. CAMPBELL,
ALTON R. KELLOGG.